United States Patent [19]

Stein

[11] Patent Number: 4,784,405
[45] Date of Patent: Nov. 15, 1988

[54] COLLAPSIBLE LUGGAGE CART

[75] Inventor: Edward B. Stein, Chicago, Ill.

[73] Assignee: Stebco Products Corporation, Chicago, Ill.

[21] Appl. No.: 77,495

[22] Filed: Jul. 24, 1987

[51] Int. Cl.$^4$ .............................................. B62B 1/04
[52] U.S. Cl. .................................. 280/655; 280/47.29
[58] Field of Search ............ 280/651, 652, 655, 47.18, 280/47.24, 47.37, 47.27, 654, 659, 47.29

[56] References Cited

U.S. PATENT DOCUMENTS

| | | | |
|---|---|---|---|
| 3,947,054 | 3/1976 | Hall | 280/47.29 X |
| 4,185,848 | 1/1980 | Holtz | 280/652 |
| 4,286,796 | 9/1981 | Esposito | 280/47.37 R X |
| 4,299,403 | 11/1981 | Brewer et al. | 280/47.29 |
| 4,448,440 | 5/1984 | Gier | 280/47.29 X |
| 4,526,399 | 7/1985 | Holtz | 280/655 |
| 4,630,837 | 12/1986 | Kazmark | 280/47.29 X |

FOREIGN PATENT DOCUMENTS

| | | |
|---|---|---|
| 2252765 | 5/1973 | Fed. Rep. of Germany . |
| 1247232 | 10/1960 | France . |
| 1380223 | 10/1964 | France . |
| 2286040 | 4/1976 | France . |
| 2359738 | 2/1978 | France . |
| 1390020 | 4/1975 | United Kingdom . |

Primary Examiner—David M. Mitchell
Assistant Examiner—Tamara L. Finlay
Attorney, Agent, or Firm—Charles F. Meroni, Jr.

[57] ABSTRACT

A collapsible luggage cart adapted to be hand carried by a user for deposit in overhead storage on an aircraft. The cart is comprised of an axle, a pair of wheels are mounted on the axle in space relation. A frame structure is connected to the axle. A U-shaped platform is supported by the wheels for carrying luggage loaded upon the platform and the cart. The platform is movable relative to the frame from a "storage position" to a "luggage position". A handle is movably positionable on the frame in vertically spaced overhead relationship to the axle. Clamp is cooperable with the handle and the frame for successively locking the handle and the frame in preselected positions, the clamp being latchable when the handle is in an upright extended position relative to the frame when the luggage cart is to be used to carry luggage, the clamp being retainingly attachable with said platform for securing said platform in its collapsed "storage position" when the clamp is released for latching engagement with the handle.

25 Claims, 3 Drawing Sheets

COLLAPSIBLE LUGGAGE CART

FIELD OF THE INVENTION

The present invention is concerned with a new and improved collapsible luggage cart which has a swingable platform movable from an upright position to a load receiving position, and a handle which is movable from its collapsed position to its upright extended position. The collapsible luggage cart is of the type that may be used for transporting personal luggage or heavy articles to and from an airplane or to and from a boat dock and alike. The present collapsible luggage cart is particularly adapted for being folded into a compact form so that it can be stored in an overhead bin above the passenger seats in an airplane.

The present invention more particularly concerns a new and improved collapsible luggage cart or a collapsible free standing luggage carrier. The collapsible luggage cart has a new and improved clamp which can be used for two important purposes, namely: 1. to clamp the swingable platform in its collapsed position to the handle when the handle is in its collapsed position 2. to secure the extendable or swingable handle in its upright extended position by clamping the handle to the upright frame. Thus, it will be seen that the same clamp serves to fulfill two clamping functions in a highly effective and efficient manner.

According to the present invention, the collapsible free standing luggage carrier or cart has a frame structure that is connected to an axle which further includes a U-shaped tubular frame member having transversely spaced frame legs positioned forwardly of the axle with lower leg ends being engagable with a ground supporting surface when in an upright position and cooperable with wheels thus providing four spaced points of ground engagement for holding the carrier in an upright free standing position. The collapsible handle is secured to the frame for enabling a user to tow the carrier or cart, and a platform is swingably mounted on the frame and movable from a stored position to a luggage carrying position. Still further, the U-shaped tubular frame member is disposed in a vertical plane and has lower leg ends which are preferably towed-in and in closer proximity to the wheels as compared to an upper end of the U-shaped tubular frame member thereby shifting the center of gravity of the carrier forward of the wheels toward the lower leg ends for balancing the carrier or cart in its free standing load receiving position.

DESCRIPTION OF THE PRIOR ART

Heretofore, various luggage carts have been proposed for use and many of such carts are in common use in many parts of the world today. Examples of such previously known luggage carts are disclosed in the following U.S. Patents:

| U.S. PAT. NO. | Patentee |
|---|---|
| D-246,774 | Patsy Esposito |
| 3,540,752 | Anuskiewicz |
| 3,998,476 | Kazmark, Sr. |
| 4,037,858 | Adams |
| 4,072,319 | Berger |
| 4,284,287 | Patsy Esposito |
| 4,286,796 | Patsy Esposito |
| 4,315,635 | Patsy Esposito |
| 4,431,211 | Richard M. Carrigan |

The state of the art concerning collapsible luggage carts has been discussed at length in U.S. Pat. No. 4,286,796. As for the patents that have been listed above, none of them are believed to be in any way anticipatory of the improved cart or carrier herein disclosed. The patents have been listed above for the purpose of showing the state of the art.

SUMMARY OF THE INVENTION

A collapsible luggage cart adapted to be hand carried by a user for deposit in overhead storage on an aircraft comprising an axle, a pair of wheels mounted on said axle in spaced relation, a frame structure connected to the axle, a U-shaped platform for carrying luggage mounted upon the cart and swingably movable relative to the frame from a storage position to a luggage carrying position, a handle on the frame in vertically spaced relationship to the axle, and clamp means carried by the handle and engageable with the frame for immobilizing and securing the handle in an upright extended fixed postion relative to the frame when the luggage cart is to be used to carry luggage, the clamp means being retainingly engageable with the platform for immobilizing and securing said platform in its collapsed storage position when the clamp means is released from engagement with said frame and a platform swingably mounted on the frame and unfoldable from a stored position to a luggage carrying position.

The foregoing frame also has a cross piece frame member mounted on the frame structure adjoining the wheels, the U-shaped platform carrying platform retaining means positioned for retaining engagement with a cross piece frame member securing the platform in its luggage carrying position.

According to still further features of my invention, the platform and the handle are of a tubular construction, the clamp means comprising a loop shaped wire clamp configurated for successive latching engagement with the tubular platform and tubular handle by arcuately moving the looped shaped wire from its platform latching position to its handle latching position.

Yet other features of my invention relate to the clamp means comprising a loop shaped wire clamp, the frame structure being U-shaped with opposite tubular leg ends thereof being supported on the axle and the wheels, the looped shaped wire clamp having its opposite ends pivotally secured with the opposite tubular leg ends in assembly therewith.

Yet other features of my invention relate to a collapsible luggage cart that is adapted to be hand carried by a user for deposit in overhead storage on an aircraft comprising an axle, a pair of wheels mounted on the axle in spaced relation, a frame structure connected to the axle, a U-shaped platform for carrying luggage mounted upon the cart and swingably movable relative to the frame from a storage position to a luggage carrying position, a handle on the frame in vertically spaced relationship to the axle, the clamp means being carried by the handle and cooperable with the platform and the frame for securing the handle in an upright extended position relative to the frame when the luggage cart is to be used to carry luggage, the clamp means carried by the handle being retainingly engageable with the platform and the frame for securing the platform in its collapsed storage position when the clamp means is released from engagement with the frame, the frame having a cross piece frame member mounted on the frame structure adjoining said wheels, and platform retaining means on the U-shaped platform positioned for retaining engagement with the frame structure securing the platform in said luggage carrying position.

Yet other preferred features relate to the cross piece frame member having loops with resiliently deflectable terminals the frame structure having spaced upright frame legs spaced opposite the resiliently deflectable terminals, and the platform having upright platform legs engageable with the resiliently deflectable terminals and the associated upright platform legs in retained assembly. Yet another feature of my invention relates to the cart being provided with clamping means that comprises a rod-like member with offset retaining clamp portions between opposite ends thereof, the rod-like member being rotatably mounted and secured with the frame structure and rotatable from an "upper position" to a "lower position" and vice versa, the offset retaining clamp portions of the rod-like member being securable with the frame member when in its "upper position" and being detachably securable with the platform in locked assembly therewith when in its "lower position" and when the platform is positioned in its so-called "storage position".

According to yet other features of my invention the platform retaining means including spaced pins, the pins being engaged with a cross piece frame member on the frame structure. The pins having enlarged heads for snap-on, snap-off retaining engagement with the cross piece frame member.

BRIEF DESCRIPTION OF THE DRAWINGS

Further features, objects and advantages of the invention will be found throughout the following more detailed description which refers to the accompanying drawings, disclosing several embodiments, wherein.

DESCRIPTION OF THE PREFERRED EMBODIMENTS

Figure 1:
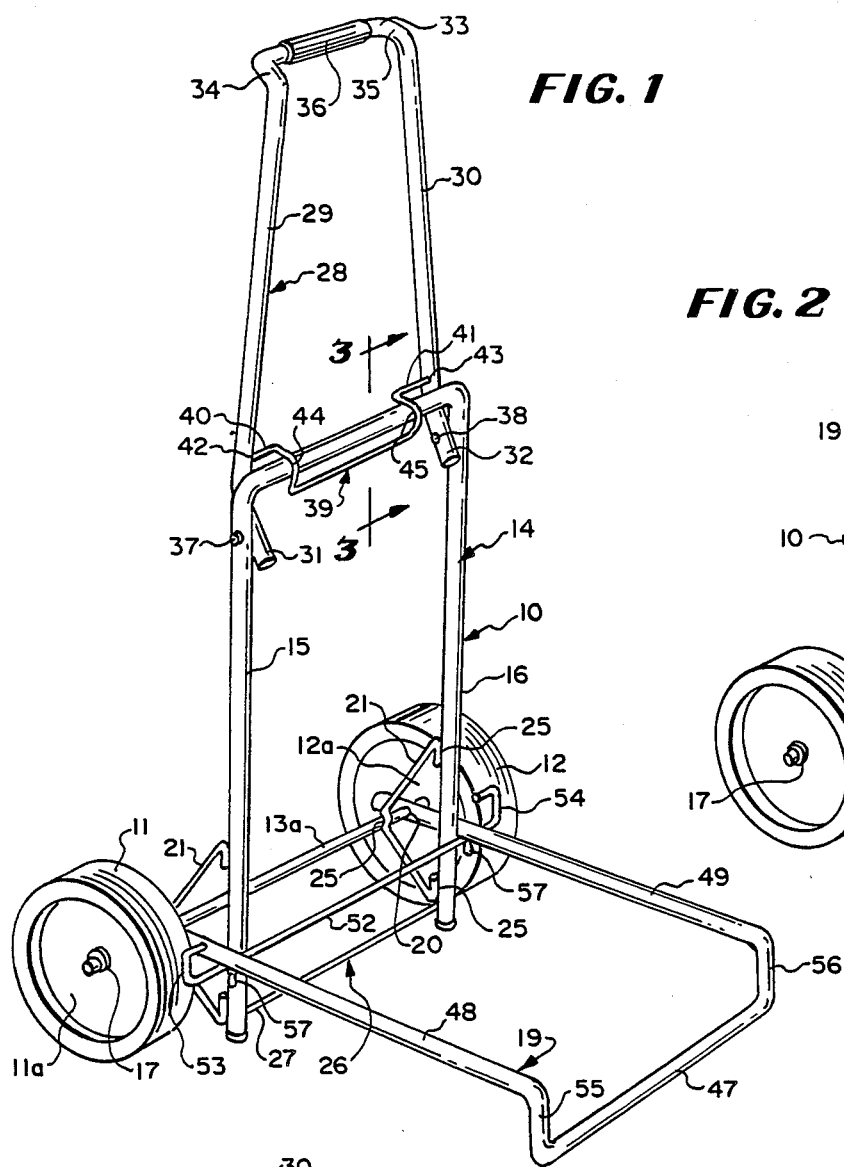
FIG. 1 is an enlarged prospective view of my collapsible luggage cart having its handle and platform components secured in extended positions for receiving luggage on the cart.

The reference numeral 10 indicates generally my collapsible luggage cart which has also been identified herein as a self-standing collapsible luggage cart. The cart 10 includes a pair of wheels 11 and 12. These wheels may have varying diameters and excellent results are obtainable where the outside diameter is 5 ¾" and where the tire treads on the wheels have a thickness of about 1 ½". Obviously, the tire may have other diameters and dimensions but excellent results can be obtained with wheels of the type here described. The wheels are connected together by an axle 13 and opposite ends of the axle extending through wheel hubs 11a and 12a. The axle 13 has an axle sheath 13a that is mounted thereon. The axle sheath has a length which is less than the distance between the wheels for reasons that will hereafter become apparent. An U-shaped inverted frame member or cart stand member 14 is provided for mounted disposition upon the axle 13. The frame member includes frame or upstanding legs 15 and 16. Screw caps 17 are provided for securing opposite ends of the axle 13 at the outside edge of the wheel hubs 11a and 12a as is apparent from FIG. 1 and 2 so that the wheels 11 and 12 are locked to the axle.

The vertically extending frame or upstanding legs 15 and 16 are joined by an intermediate horizontally extending top frame leg 18. A U-shaped swingable platform 19 is mounted on the axle as shown in FIG. 1 where the platform is disposed in its luggage forming position. The platform 19 is disposed in its collapsed position as viewed in FIG. 2. The U-shaped platform has leg holes 20—20 and the axle extends through the leg holes 20—20 thus enabling the swingable platform to be rotated on the axle 13. It will be further seen that the sheath 13a is disposed on the inside of the leg holes 20—20 and acts as a means to positively locate and position the platform legs relative to the axle and the sheath.

Also, mounted on the axle 13 and the frame member 14, are a pair of transversely spaced one-piece truss member 21—21. The truss members 21—21 each has turned opposite ends and an intermediate indented or bowed truss portion. These one-piece truss members 21—21 are each secured by three welds 25 at points of juncture between the bowed truss portion and the axle sheath 13a and at the points where the turned opposite ends of each truss member are engaged with the associated leg of the U-shaped inverted frame member 14.

Figure 2:
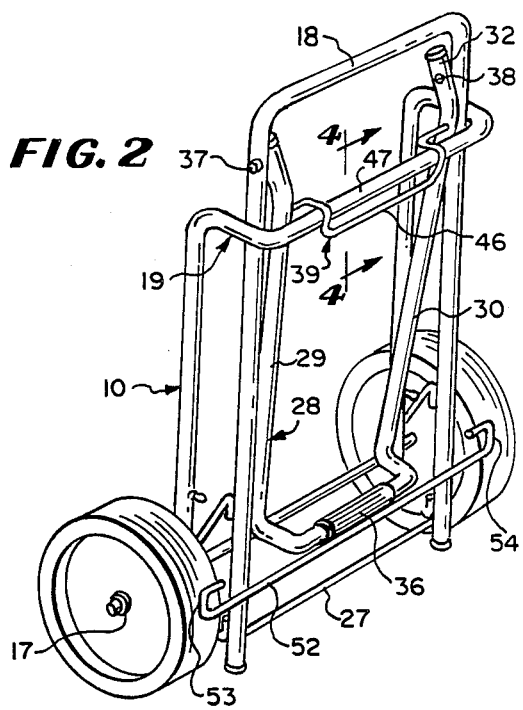
FIG. 2 is an enlarged prospective view of the cart shown in FIG. 1 only showing the same cart with its components positioned in a portable collapsed position for readily transport or storage in an overhead bin in an aircraft.
Figure 3:
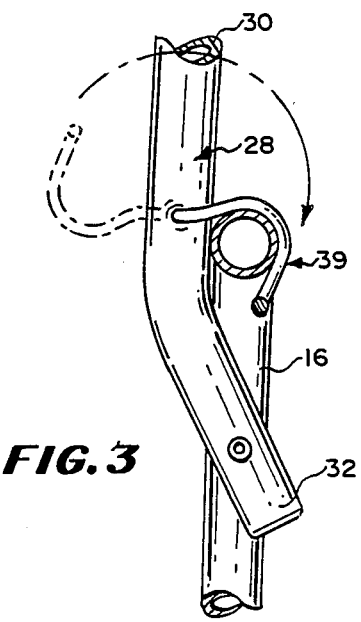
FIG. 3 is an enlarged fragmentary cross sectional view taken on the line 3—3 looking in the direction indicated by the arrows as shown in FIG. 1.
Figure 4:
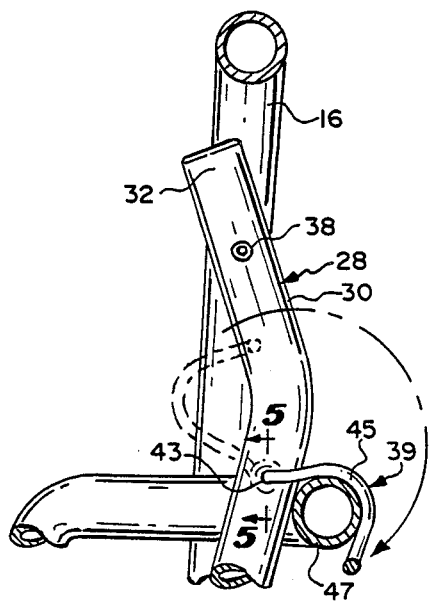
FIG. 4 is an enlarged fragmentary cross sectional view taken on the line 4—4 looking in the direction indicated by the arrows as seen in FIG. 2.

A box frame structure 26 is also provided for ridigifying the cart. The box frame includes a lower cross piece frame member 27 which in turn co-acts with the truss members 21—21, the axle 13, and the axle sheath 13a to provide the reinforced box frame 26. The opposite ends of the lower cross piece frame member 27 are also welded to the legs of the upright U-shaped frame member 14. As will be seen in FIGS. 1, 3 and 10, the luggage cart 10 is provided with a U-shaped swingable handle member 28. The U-shaped swingable handle member 28 is shown in its collapsed or portable position in FIG. 2 whereas it is shown in its extended fixed upright position in FIGS. 1 and 10. FIG. 3 shows the handle in its upright fixed extended position whereas FIG. 4 shows the handle 28 in its collapsed position. It will further be observed from the drawings that the handle member 28 includes upright handle legs 29 and 30. The handle legs 29 and 30 are provided with off-set handle leg ends 31 and 32. The handle legs 29 and 30 are joined together by a top handle portion or leg 33. It will be further observed in FIG. 1 that the top handle portion 33 is joined to the legs by off-set leg ends 34 and 35 located at the upper ends of the legs 29 and 30 when the handle 28 in its upright extended position. For the comfort of the user, the upright handle 28 has a handle grip 36 mounted thereon. The handle 28 is secured by riveted pivots or pivot pins 37 and 38 to the legs 15 and 16 of the U-shaped inverted frame member or cart stand 14. These pivot pins 37 and 38 serve to permit the handle member to be swung from its collapsed transport position (FIG. 2) to its luggage carrying position (FIG. 1).

In order to secure the handle 28 in its extended position (FIG. 1) and in order to secure the swingable platform 19 in its collapsed position (FIG. 2) a loop-shaped clamp 39 is provided. This loop-shaped clamp member can be made of a ¼" chrome rod or wire. Before the handle 28 has been formed to shape, spaced opposite ends 40 and 41 of the clamp member 39 are insertable into recessed or indented leg holes 42 and 43 provided on the legs 29 and 30 of the swingable handle member 28. The holes 42 and 43 in the legs 29 and 30 are indented to provide recessed areas at the points where the hles 42 and 43 are formed so that the opposite ends 40 and 41 of the clamp member 39 can be engaged in sockets formed in the legs 29 and 30 resist displacement. The loop-shaped clamp member 39 is further provided with transversly spaced tube retaining clamp off-set portions 44 and 45. The transversly spaced tube retaining clamp off-set portions 44 and 45 are joined together by a reinforcing connecting clamp leg 46.

In operation, it will be seen that when the clamp member 39 is in a so-called upper position at the time when the handle 28 is in its extended positon, that the handle member can be swung in a downwardly extending direction so that its transversely spaced tube off-set retaining clamp portions 44 and 45 can be engaged with the top frame leg 18 of the U-shaped inverted frame member or cart stand frame member 14 to thereby secure these components in fixed relation relative to one another. In further operation of the loop shaped clamp member 39, it will be seen in FIG. 2 that when the handle member 28 is in its so-called "collapsed or transport position" that the position of the clamp 39 on the handle member 28 can be lowered so by reotating the clamp member 39 so that it can be moved into a so-called "lower position" when the clamp underlies the frame leg 18. At this point in time, it will be recalled that previously when the clamp member 39 was used to secure the handle member 28 in its "upright transport or extended position" that the clamp was positioned in overlying position to the leg 18. Now when the handle member 28 is moved to its "collapsed or transport position", the clamp member 39 then underlies leg 18 of the frame member 14. We thus have a situation where the clamp is positioned in different horizontal planes as it effects its intended clamping function. When the clamp member 39 is in its "lower position", it can then be used to fixedly secure the swingable platform 19 in an "upright platform". At this point in time, the transversely spaced tube retaining clamp off-set portions 44 and 45 are engaged with an upper platform leg 47 of the U-shaped platform member 19 (FIG. 2 and FIG. 4). The U-shaped platform member 19 is also possessed of spaced platform legs 48 and 49 (FIG. 1).

The U-shaped frame member 14 is further provided with an upper cross piece frame member 52. This frame member 52 has turned up C-shaped ends 53 and 54 thereon. These C-shaped ends 53 and 54 serve to provide rests for the luggage when the platform is in a down position as seen in FIG. 1 so that the luggage may be held in spaced relationship to the wheels 11 and 12 to prevent contact there between. These rests or wheel shields enable the wheels 11 and 12 to freely roll so that the luggage cannot be forced into contact with the wheels to inhibit movement of the cart as it is being towed behind by a person.

The platform member 19 is further provided with down turned platform leg ends 55 and 56. These ends function to provide spacers to enable the platform leg 47 to act as a floor rest when the platform 19 is swung into its luggage carrying position as shown in FIG. 1.

Figure 5:
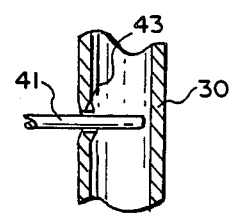
FIG. 5 is an enlarged fragmentary cross sectional view taken on the line 5—5 looking in the direction indicated by the arrows as seen in FIG. 4.
Figure 6:
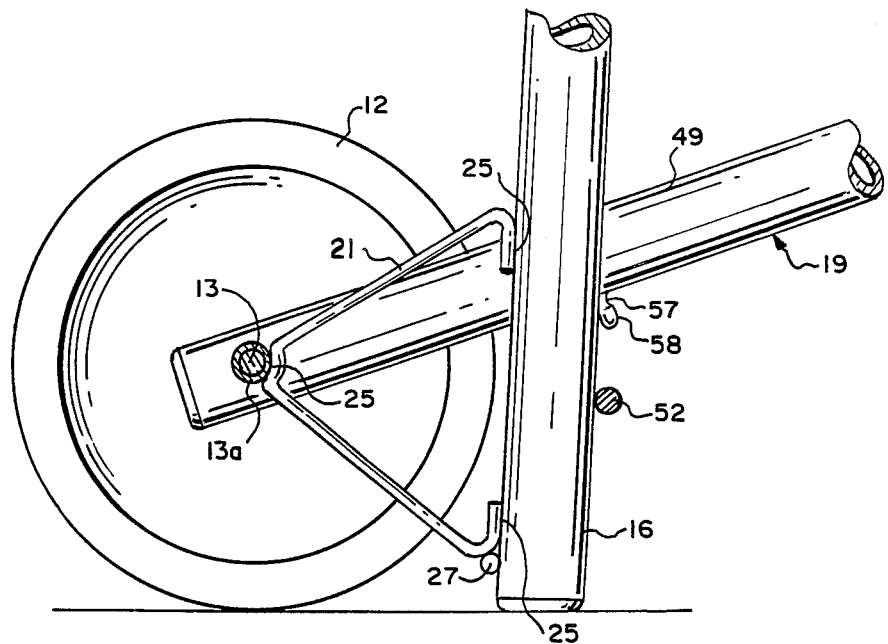
FIG. 6 is an enlarged fragmentary side elevation of the platform showing the way the platform is swung from its upright position to its luggage transport position and the way in which the pin fastener co-acts to lock the platform in place.
Figure 7:
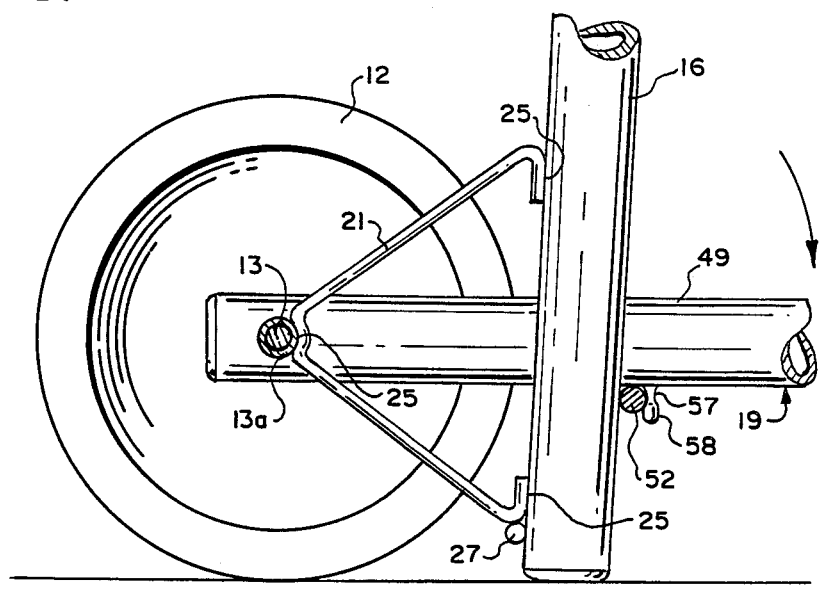
FIG. 7 is an enlarged fragmentary side view similar to FIG. 7 only showing the platform in its locked position on the luggage cart frame.

Now in order to secure the platform 19 in a fixed position relative to the frame 14, platform snap fasteners 57—57 have been provided at transversely spaced intervals on the underside of platform legs 48 and 49 (FIG. 1 and FIGS. 6 and 7). Now each of these fasteners 57—57 has an enlarged end or pin head 58—58 for snapping over and behind the upper cross piece frame member 52. These frame member cross pieces 27 and 52 are secured in welded assembly with the frame or stand legs 15 and 16 of the U-shaped inverted frame member or cart stand member 14. The action of the fasteners can best be seen in FIGS. 5 and 6 where in FIG. 5 the platform 19 is being moved downwardly causing the fasteners 57 to be moved in proximity to the upper cross piece member 52. In FIG. 7, the platform member is there shown as being bottomed upon the upper cross piece frame member 52 in such a way that the fastener head 58 is resiliently sprung over the upper cross piece frame mbmer 52 until the head 58 is moved to an underside position of the circular rod comprising the upper cross piece frame member 52 thereby fixedly positioning the platform 19 relative to the frame member 14.

It will be further observed from a study of the drawings, and particularly FIGS. 6 and 7 that the legs 15 and 16 of the frame member or cart stand member 14 are slightly inclincded with the lower end of the legs 15 and 16 being closer to a vertical plane through the wheel axle of the wheels 11 and 12 then the upper ends of the legs 15 and 16. As a result of this geometrical relationship, the center of gravity of the cart can be moved forwardly from the wheels in a direction towards the legs 15 and 16. Since the legs 15 and 16 are also of a sufficient length so that they extend downwardly to a point aligned in a common plane with the outside diameter of the wheels 11 and 12, the cart is thus provided with four points of ground engagement. It is in this way that the cart can be supported in a upright free standing position according to important features of my invention. No longer is it necessary for a cart user to put his collapsible luggage cart on the ground in a flat position. The user can now be allowed the convenience of pulling the cart behind himself or herself and allow the cart to be placed in a standing position so that the hands of the user can be free to engage in some other function while the cart is left unsupported and so that the user doesn't have to pick up the cart from a flat position on the ground.

Figure 8:
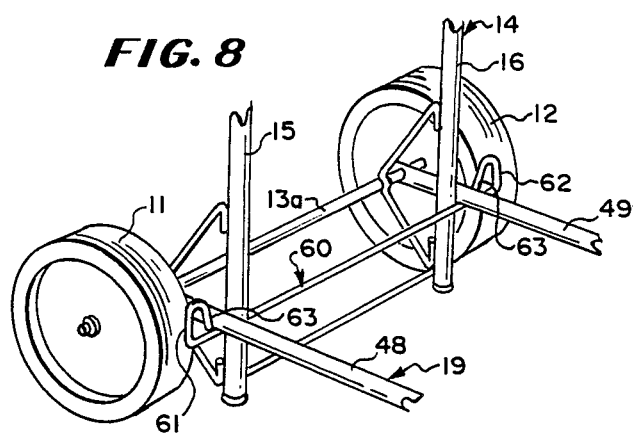
FIG. 8 is an enlarged fragmentary prospective view of a modified collapsible luggage cart where a preferred platform fixing attaching arrangement is provided for securing the luggage carrying platform in its luggage receiving position.
Figure 9A:
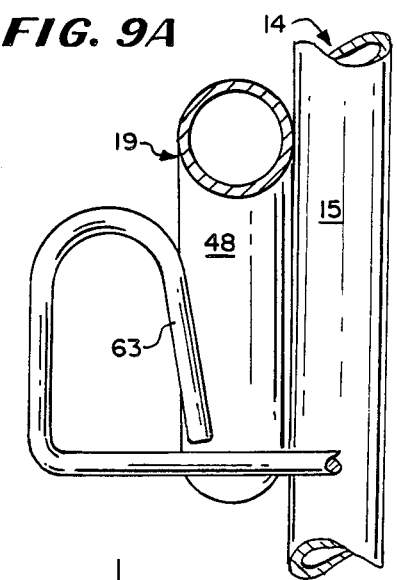
FIGS. 9A and 9B are enlarged fragmentary side elevational views in partial section showing the way in which the platform can be locked in place in its luggage receiving position.
Figure 9B:
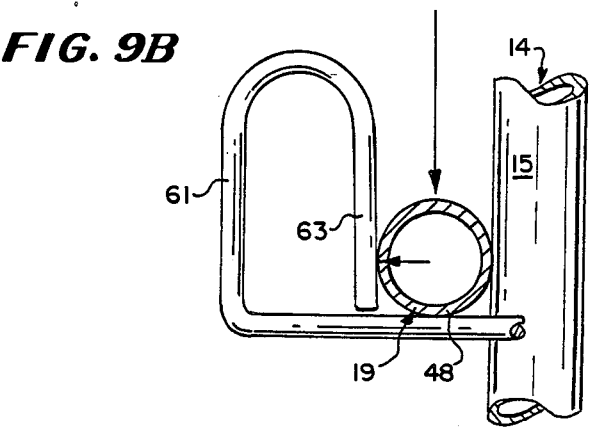
Figure 10:
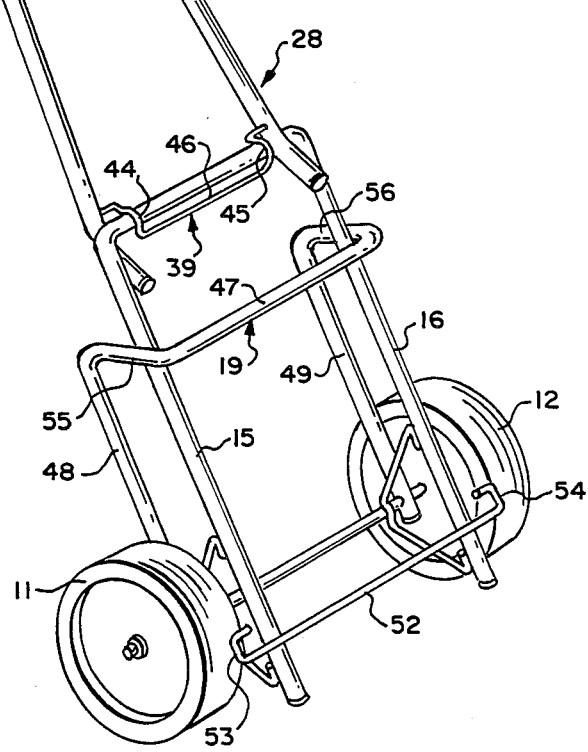
FIG. 10 is a prospective view of the luggage cart shown in FIG. 1 only with the luggage cart positioned in its collapsed position and with the handle in its upright position to enable ready transport of the luggage cart by its user when free of luggage.

In FIGS. 8, 9 and 10, I have shown a preferred form of my invention wherein the snap fasteners 57—57 have been eliminated. In this form, I have provided the cart with a cross piece member 60 similar to cross piece member 52, except that this cross piece member 60 is provided with loop shaped opposite ends 61 and 62 each having resiliently reflectable legs 63—63. These legs can be flexed in the manner shown in FIG. 9A and 9B to provide a wedge lock for the platform legs 48 and 49 between the resiliently deflectable loop legs 63—63 and the associated frame legs 15 and 16 to thereby securely position the platform in its load receiving or luggage receiving posture. This wedge lock arrangement provided by the resiliently deflectable legs 63—63 functions in a way to enable to the platform 19 to be supported on the upper cross piece frame member in the same way as previously described in connection with the preferred embodiment of my invention.

With respect to the dimensions of my collapsible luggage cart, it will be appreciated that the dimensions can be varied but I have found excellent results can be obtained where the wheels have an outside diameter of approximately 5½" and a width of roughly 1 ⅜". The platform may have a length of approximately 15", the handle may be 17", and the cart when in its extended position with the handle being clamped in a upright position can have a standing height of 36". In addition, the frame can be approximately 22" high when in its upstanding free standing position. Excellent results can also be obtained by manufacturing the frame, the handle, and the platform from chrome steel tubing having a diameter of approximately 5/16".

In summation and according to certain features of my invention, the clamping means 39 comprises a rod-like member with offset retaining clamp portions 44 and 45 between opposite ends thereof, the rod-like member being rotatably mounted and detachable securable with the frame structure and rotatable from an "upper position" above the frame leg 18 to a "lower position" and vice versa, the offset retaining clamp portions of the rod-like member being securable with the frame member 14 when in its "upper position" and being detachably securable with the platform 19 in locked assembly therewith when in its "lower position" and when the platform is position in its so-called "storage position".

We claim:

1. A collapsible luggage cart adapted to be hand carried by a user for deposit in overhead storage on an aircraft comprising an axle, a pair of wheels mounted on said axle in spaced relation, a frame structure connected to the axle, a U-shaped platform for carrying luggage mounted upon the cart and swingably movable relative to the frame from a storage position to a luggage carrying position, a handle on the frame in vertically spaced relationship to the axle, and clamp means carried by the handle and engageable with the frame for immobilizing and securing the handle in an upright extended fixed position relative to the frame when the luggage cart is to be used to carry luggage, said clamp means being retainingly engageable with said platform for immobilizing and securing said platform in its collapsed storage position when said clamp means is released from engagement with said frame.

2. The cart of claim 1 further characterized by said frame having a cross piece frame member mounted on said frame structure adjoining said wheels, said U-shaped platform carrying pin means positioned for snap-on, snap-off retaining engagement with said cross piece frame member securing said platform in said luggage carrying position.

3. The cart of claim 1 further characterized by said frame having a cross piece frame member mounted on said frame structure adjoining said wheels, said cross piece frame member having opposite looped shaped resiliently deflectable ends in retaining engagement with said U-shaped platform securing said platform in said luggage carrying position.

4. The cart of claim 1 further characterized by the said frame structure being U-shaped and having upright spaced frame legs, pivotal connections between the handle and legs enabling the handle to be pivoted from an underlying position to an overlying position relative to the U-shaped frame structure.

5. The cart of claim 4 further characterized by the clamp means being carried by said handle and being securable with said frame from fixedly securing said handle only when said handle is in its overlying position relative to the frame.

6. The cart of claim 4 further characterized by the clamp means being carried by said handle and being securable with said swingable platform only when said platform is in its storage position.

7. The cart of claim 1 further characterized by said platform and said handle being of a tubular construction, said clamp means comprising a loop shaped clamping rod configured for successive latching engagement with the tubular platform and the frame by acruately moving the looped shaped rod from its platform latching position to its frame latching position.

8. The collapsible luggage cart of claim 1 further characterized by the platform being swingable mounted on the frame and unfoldable from a stored upright position to a ground engaging position for receipt of luggage.

9. The cart of claim 1 further characterized by said clamp means comprising a loop shaped clamping rod with opposite ends pivotally mounted on the handle, the clamping rod having a pair of transversly spaced hook spaced retaining portions for hooked engagement with the platform and the frame.

10. The cart of claim 9 further characterized by the hook shaped retaining portions being connected together by a reinforcing linking clamp portion positioned beneath an upper end of the handle when clamping the platform in its storage position.

11. The cart of claim 1 further characterized by the clamping means comprising a rod-like member with offset retaining clamp portions between opposite ends thereof, the rod-like member being rotatably mounted at its opposiste ends on the handle and lockingly securable with the frame structure and rotatable from an "upper position" to a "lower position" and vice versa, the offset retaining clamp portions of the rod-like member being securable with the frame member when in its "upper position" and being lockingly securable with the platform in locked assembly therewith when in its "lower position" and when the platform is positioned in its so-called "storage position".

12. A collapsible luggage cart adapted to be hand carried by a user for deposit in overhead storage on an aircraft comprising an axle, a pair of wheels mounted on said axle in spaced relation, a frame structure connected to the axle, a U-shaped platform supported by the wheels for carrying luggage loaded upon the platform and the cart, the platform being movable relative to the frame from a "storage position" to a "luggage carrying position", a handle being movably positionable on the frame in vertically spaced overhead relationship to the axle, and clamp means carried by the handle and cooperable with the platform and the frame for successively locking the handle in preselected positions, the clamp means being latchable with said frame when the handle is in an upright extended position relative to the frame when the luggage cart is to be used to carry luggage, said clamp means being retainingly attachable with said platform for securing said platform in its collapsed "storage portion" when said clamp means is released from latching engagement with said frame.

13. The cart of claim 12 further characterized by said frame having a cross piece frame member mounted on said frame structure adjoining said wheels, said U-shaped platform carrying pin means positioned for snap-on, snap-off retaining engagement with said cross piece frame member securing said platform in said luggage carrying position.

14. The cart of claim 12 further characterized by said platform and said handle being of a tubular construction said clamp means comprising a loop shaped clamp configuration for successive latching engagement with the tubular platform and the frame by arcuately moving the looped shaped clamp from its platform latching position to its frame latching position.

15. The cart of claim 12 further characterized by said frame member having a rod shaped cross piece secured thereto and having resiliently deflectable looped shaped ends at opposite ends of the cross piece, the platform when in its luggage carrying position being retainingly wedged between the frame and said resiliently deflectable opposite looped shaped ends.

16. The cart of claim 12 further comprised of clamping means including a rod-like member with offset retaining clamp portions between opposite ends thereof, the rod-like member being rotatably mounted on the handle and detachably securable with the frame and platform and rotatable from an "upper position" to a "lower position" and vice versa, the offset retaining clamp portions of the rod-like member being securable with the frame member when in its "upper position" and being detachably securable with the platform in locked assembly therewith when in its "lower position" and when the platform is positioned in its so-called "storage position".

17. A collapsible luggage cart adapted to be hand carried by a user for deposit in overhead storage on an aircraft comprising an axle, a pair of wheels mounted on said axle in spaced relation, a frame structure connected to the axle, a U-shaped platform for carrying luggage mounted upon the cart and swingably movable relative to the frame from a storage position to a luggage carrying position, a handle on the frame in vertically spaced relationship to the axle, clamp means carried by the handle and engageable with the frame for securing the handle in an upright extended position relative to the frame when the luggage cart is to be used to carry luggage, said clamp means being retainingly engageable with said platform for securing said platform in its collapsed storage position when said clamp means is released from engagement with said frame, said frame having a cross piece frame member mounted on said frame structure adjoining said wheels, pin means on said platform and being position for retaining engagement with the cross piece frame member;

18. The cart of claim 17 further characterized by the clamping means comprising a rod-like member with offset retaining clamp portions between opposite ends thereof, the rod-like member being rotatably mounted on the handle and detachably securable with the frame and platform and rotatable from an "upper position" to a "lower position" and vice versa, the offset retaining clamp portions of the rod-like member being securable with the frame member when in its "upper position" and being detachably securable with the platform when in locked assembly therewith when in its "lower position" and when the platform is positioned in its so-called "storage position."

19. The cart of claim 18 further characterized by the rod-like member overlying the frame structure when in its "upper position" and underlying at least a portion of the frame structure when in its "lower position".

20. The cart of claim 17 further characterized by the frame structure including an inverted U-shaped tubular frame member having spaced upright legs and a mid-leg joining the upright legs at upper ends thereof, and means operatively connecting the upright legs to the axle.

21. The cart of claim 20 further characterized by the clamping means comprising a rod-like member with offset retaining clamp portions between opposite ends thereof, the rod-like member being rotatably mounted on the handle and detachably securable with the frame and platform and rotatable froman "upper position" to a "lower position" and vice versa, the offset retaining clamp portions of the rod-like member being securable with the frame member when in its "upper position" and being detachably securable with the platform in locked assembly therewith when in its "lower position" and when the platform is positioned in its so-called "storage position", the rod-like member, when it in its "upper position" overlying the mid-leg of the inverted U-shaped tubular frame member, the rod-like member when in its "lower position" then underlying the mid-leg of the U-shaped tubular frame member.

22. A folding free standing luggage carrier adapted to be hand carried by a user and stored in an overhead bin on an aircraft when folded and being adapted for transporting loads from one point to another when comprising an axle, a pair of wheels mounted on said axle in transversly spaced relation, a frame structure connected to the axle including a U-shaped tubular frame member having transversely spaced frame legs positioned forwardly of the axle with lower leg ends being engageable with a ground supporting surface when in an upright position and cooperable with the wheels providing four spaced points of ground engagement for holding the carrier in an upright free standing position, a foldable handle secured to the frame for enabling a user to tow the carrier, a platform swingably mounted on the frame and unfoldable from a stored position to a luggage carrying position, and clamping means comprising a rod-like member with offset retaining clamp portions between opposite ends thereof, the rod-like member being rotatably mounted on the handle and secured with the frame structure and rotatable from an "upper position" to a "lower position" and vice versa, the offset retaining clamp portions of the rod-like member being securable with the frame member when in its "upper position" and being detachably securable with the platform in locked assembly therewith when in its "lower position" and when the platform is positioned in its so-called "storage position".

23. The luggage carrier of claim 22 further characterized by box frame means being between the axle and the legs of the U-shaped tubular frame member providing a solid base for the luggage carrier whether in a free standing position or when in a luggage carrying position.

24. The luggage carrier of claim 22 being further characterized by the frame legs and the wheels providing the four points of support maintaining the luggage carrier in an upright position when the carrier is in either its collapsed position or its load carrying position, the handle and the platform being formed from lightweight tubular metal.

25. The luggage carrier of claim 22 further characterized by said U-shaped tubular frame member being positioned with the U-shaped tubular frame member being disposed in vertical plane and with the lower leg ends being towed-in in closer proximity to the wheels as compared to an upper end of the U-shaped tubular frame member thereby shifting the center of gravity of the carrier forward of the wheels toward the lower leg ends for balancing the carrier in its free standing position.

* * * * *